United States Patent [19]

Lowrance et al.

[11] Patent Number: 4,569,146
[45] Date of Patent: Feb. 11, 1986

[54] SUBMERSIBLE FISHING AID

[76] Inventors: Arlen J. Lowrance; Constance A. Lowrance, both of 142 E. 26th Ct., Tulsa, Okla. 74114

[21] Appl. No.: 451,079

[22] Filed: Dec. 20, 1982

[51] Int. Cl.⁴ ............................................. A01K 79/00
[52] U.S. Cl. ........................................... 43/4; 43/4.5; 43/17.5; 43/17.1
[58] Field of Search ...................... 43/4, 4.5, 17, 17.1, 43/17.5, 27.4, 100, 102, 103

[56] References Cited

U.S. PATENT DOCUMENTS

| 1,410,817 | 3/1922 | Lloyd | 43/17 |
| 2,163,973 | 6/1939 | Benca | 43/100 |
| 4,147,130 | 4/1979 | Goguel | 43/102 |
| 4,262,379 | 4/1981 | Jankiewicz | 43/100 |
| 4,373,288 | 2/1983 | McCrink | 43/100 |

OTHER PUBLICATIONS

Spencer Gifts, 1974.

Primary Examiner—Kuang Y. Lin
Assistant Examiner—Kurt Rowan
Attorney, Agent, or Firm—Robert E. Massa

[57] ABSTRACT

A submersible fishing aid, for use in a body of water, having a floatable fishing buoy with means to attach one or more fishing lines therefrom, a retrievable capsule detachably supported to the fishing buoy, the retrievable capsule being also secured to the fishing buoy by means of a line, a weight detachably affixed to the fishing buoy having a line extending from the weight to the fishing buoy, a mechanism for detaching the weight when the fishing buoy is placed in the water so that the weight settles to the bottom of the body of water to float the fishing buoy at a height above the water bottom selected by the length of the line extending from the weight to the fishing buoy and a mechanism operable by a selected event such as, at a selected time, a sonar signal or a fish pulling on one of the hooks attached to the fishing buoy, to cause a detachment of the retrievable capsule from the fishing buoy which floats to the surface permitting the fishing aid to be retrieved.

12 Claims, 1 Drawing Figure

U.S. Patent  Feb. 11, 1986  4,569,146
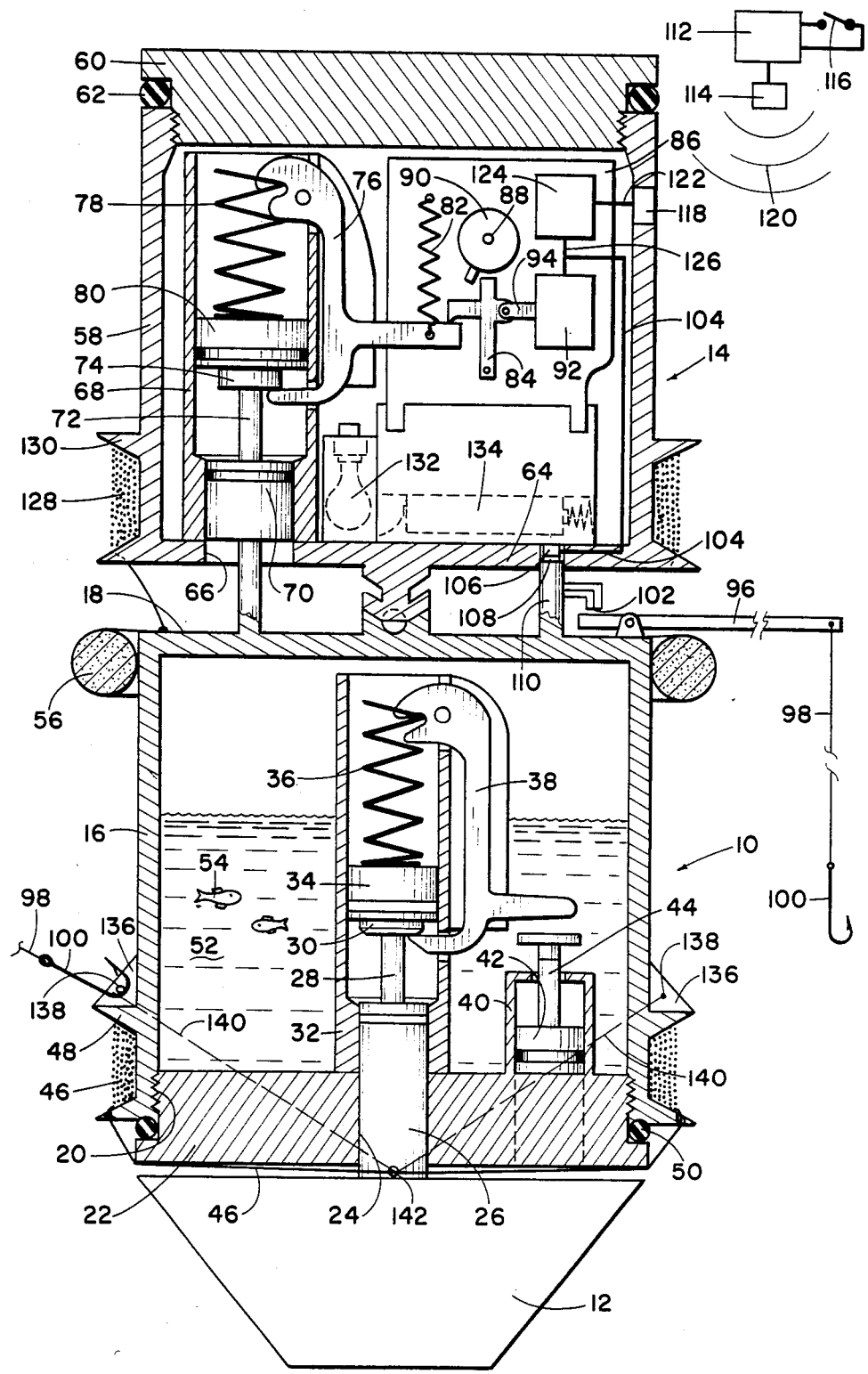

SUBMERSIBLE FISHING AID

BRIEF SUMMARY OF THE INVENTION

A submersible fishing aid for use by fishermen in a body of water is provided. The fishing aid is adapted to place a baited hook in a body of water at a prescribed depth where fish are expected to be found or where fish appear as indicated by sonar apparatus. The device includes means not only for supporting one or more fish hooks at the preselected depth but, in addition, includes means for retrieving the device.

The fishing aid includes a floatable fishing buoy having means such as short poles or rods extending therefrom for supporting one or more fish hooks. A weight is detachably affixed to the fishing buoy, and a retrievable capsule is also detachably supported to the fishing buoy. A mechanism is provided for detaching the weight from the fishing buoy so that the weight settles to the bottom of a body of water. The fishing buoy can be dropped into a body of water, after which the weight will detach from the fishing buoy. A cord or line attaches the weight to the fishing buoy and provides a means of selecting the height of flotation of the fishing buoy above the bottom of the body of water in which it is used. The length of the line can be preselected by winding it a predetermined number of turns on a spool on the outside of the fishing buoy.

A retrievable capsule is detachably supported to the fishing buoy as previously mentioned and is normally retained with the fishing buoy until the occurrence of a preselected event, such as: (1) the pull of a fish against one of the fish hooks of sufficient force to indicate that the fish has been caught by the hook; (2) the occurrence of a preselected time delay; or (3) the transmission of a retrievable signal such as by means of a sonar apparatus. Upon the occurrence of any of these events, the retrieval capsule is released from the fishing buoy and floats to the surface. A cord or line attaches the retrieval capsule to the fishing buoy. The length of cord or line can be selected by winding the line on a spool on the fishing buoy before the device is deposited in the water.

The retrieval capsule may include a light so that it can be spotted at night.

Many additional innovative features can be incorporated in the basic concept. For instance, the fishing buoy may be at least partially defined by a clear plastic or glass portion. Water and minnows may then be kept within the fishing buoy to attract fish.

In typical use, a fisherman will employ a plurality of the fishing aids. He will first ascertain, by the use of sonar devices, the location and depth of fish. The user then can bait and deposit a number of the fishing aids in a scattered area. If fish are attracted and take the hooks attached to the devices, the retrieval capsules will come to the surface and the devices with the fish attached can be recovered. If the fish are not attracted to one or more of the aids after a preselected time, the retrival buoys will appear or, upon a signal which can be transmitted from a sonar device, the signal buoys can be released so that the fishing aids can be recovered. The fishing aid thus produces an entirely new approach to fishing for use either by the sport fisherman or the commercial fisherman.

BRIEF DESCRIPTION OF THE SEVERAL VIEWS OF THE DRAWING

The drawing shows an apparatus for use in practicing this invention in cross-sectional configuration and shows a sonar signal transmitting means in schematic view.

DETAILED DESCRIPTION

The drawing shows an embodiment of the invention for purposes of exemplifying one arrangement in which the invention can be practiced. It is understood that the invention may be employed in any number of different types and styles of fishing aids which, in their commercial embodiments, may have physical appearances which are completely different than that illustrated herein but which, nevertheless, employ the principles of the invention.

The invention includes as the basic components: (a) a flotable fishing buoy generally indicated by the numeral 10; (b) a weight 12; and (c) a retrieval capsule generally indicated by the numeral 14. The object of the device is to place the fishing buoy 10 at a depth in a body of water where fish are expected to be located such as revealed by a good quality sonar type fish locator. The fishing buoy 10 includes a housing 16 with a closed top end 18 and an open bottom having internal threads 20. A lid 22 having external threads sealably closes the housing 16.

The lid 22 includes central passageway 24 which receives a shaft 26 extending from weight 12. The shaft has a reduced diameter portion 28 and at the upper end a catch portion 30 of increased diameter.

A cylinder 32 is attached to the lid 22 and continues the internal opening 24. Positioned in the cylinder is a piston 34 and a spring 36. When the shaft 26 is inserted in recess 24 the catch portion 30 engages cylinder 34, moving it upwardly, compressing spring 36.

Attached to the cylinder 32 is a trigger catch 38 having a portion which normally engages the lower end of the shaft catch portion 30 to retain the shaft within recess 24 and thereby the weight 12 attached to the fishing buoy.

Affixed to the upper surface of the lid 22 is a second shorter length cylinder 40, the lower end of which communicates with the lower end of the lid and thereby is subjected to the pressure of water in which the fishing buoy is positioned. Within the cylinder 40 is a piston 42 having a shaft 44. When the fishing buoy 10 is positioned in water, the weight 12 causes it to sink. As it sinks, the water pressure increases, moving piston shaft 44 upwardly, engaging the catch member 38, causing it to release engagement within the catch portion 30 of shaft 26, thereby permitting weight 12 to separate from the fishing buoy.

Weight 12 is connected to the fishing buoy housing by means of a cord or line 46 which is wrapped about a retrievable anchor line storage spool 48. The diameter of housing 16 is preferably arranged in some even ratio to a measuring unit, such as footage. An ideal arrangement is to provide the housing 16 of a diameter such that one wrap of the line 26 in spool 48 is equal to one foot of length of line. To set the fishing buoy 10 at the proper depth, the user can find the depth of water in which he intends to fish by means of a sonar fish locator. For instance, if he finds the depth of the water to be sixty feet and the sonar device indicates that fish are congregating at forty feet of depth, then the user knows that he wants the fishing buoy 10 to be twenty feet from the bottom. He thus will wrap line 46 about the spool 48 twenty times and tie off the line so that when the fishing buoy 10 is dropped in the water and weight 12 is released by actuation of piston 42 against trigger member 38, the weight will settle to the bottom, and the housing 16 will tend to float with line 46 holding the housing twenty feet above the weight and, therefore, in the exact elevational position at which fish have been found by the sonar device.

The housing 16 may be made of transparent material, such as plastic, and lid 22 can be made to fit watertight by means of an O-ring gasket 50. The interior of the housing 16 can be at least partially filled with water 52 and minnows or bait fish 54 placed therein. When the fishing buoy is positioned in water, the presence of the minnows or bait fish 54 will attract fish to the device. Further, in order to illuminate the bait fish, a light (not shown) operated by a battery source (also not shown) may be positioned within the fishing buoy, if desired.

When the interior of housing 16 is to be at least partially filled with water to receive minnows, the weight of the fishing buoy is increased. If additional flotation is required to ensure that the fishing buoy will float, an optional flotation ring 56 may be employed.

The retrievable capsule 14 is formed by a housing 58 which is closed at the upper end by a lid 60. An O-ring gasket 62 makes the lid watertight so that it is thereby floatable. In the bottom end 64 of the housing there is an opening 66 which communicates with a cylinder 68. Extending from the top end 18 of the fishing buoy housing 16 is a piston 70 having an integral upper extending shaft portion 72 terminating in an upper enlarged diameter catch portion 74. The piston 80 seals the opening 66 against the entrance of water into the interior of housing 58.

Pivotally supported to the cylinder 68 is a trigger member 76 having a lower end portion which engages the catch portion 74 so that when the trigger member is in the closed position, as indicated, the piston 70 is retained within opening 66 and thereby the retrival capsule housing 58 is secured to the fishing buoy housing 16. When the trigger member 76 is actuated to release engagement with catch portion 74, spring 78 pushes downwardly on piston member 80 which in turn displaces downwardly the piston 70, thereby disengaging the retrival capsule housing 58 from fishing buoy housing 16. Since the interior of the retrieval capsule housing 58 is closed against water entrance, it will float to the water surface.

A variety of means may be provided to release the retrieval capsule 14 from the fishing buoy 10, including a timed release mechanism operated when a fish is caught, or a signal transmitted from the water surface such as a sonar signal.

A spring 82 supplies an upward pull on the trigger member 76 which is held by a pivoted catch 84. A spring wound timer 86 has a shaft 88 connected to a trip wheel 90. The spring wound timer 86 may be wound by a key (not shown) and set to actuate in a preselected length of time, such as at the end of one hour, two hours, etc. When the set time elapses: Shaft 88 rotates—rotating the trip wheel 90, which engages catch 84, moving it out of engagement with the trigger member 76, and causing the retrieval capsule to be separated from the fishing buoy.

The catch 84 may also be actuated by a solenoid 92 having a plunger 94 extending from it. When the solenoid 92 is energized, the retrieval capsule is released. In the normal application of the invention, it will be desirable that the retrieval capsule be released when a fish is caught. Thus, any mechanism which can actuate the mechanism to release the retrieval capsule upon the pull of a fish is in keeping with the purpose of the invention. An illustrated means includes a short length pole 96 extending from fishing buoy housing 16. The outer end of pole 96 has a short fishing line 98 and a fish hook 100 attached to it. Bait placed on hook 100 will serve to lure fish. When a fish is caught, pole 96 will be pivoted to close an electrical contract 102 which extends by way of conductor 104 to solenoid 92. This is merely by way of example only, as many means exist for releasing the trigger member 76 upon the pull of a fish, including not only the electrical means shown as an example, but mechanical devices may also be employed. Conductor 104 has as a part of its circuit a contact 106 positioned in a recess in the bottom end 64 of the retrieval capsule housing which engages a contact 108 at the upper end of a boss portion 110 extending from the housing, so that when the retrieval capsule is released from engagement with the fishing buoy, contacts are severed but are automatically made when the two components are assembled together for operation.

As previously indicated, another means of causing the retrieval capsule to release from the fishing buoy and travel to the earth's surface is by means of a signal sent from the water surface such as by means of a sonar device 112 having a transponder 114. Upon closing of a switch 116, a sonar signal is transmitted. Formed within or as a part of housing 58 is a receiving transponder 118 which receives sonic signals 120. The received sonic energy is converted into electrical signals supplied by conductor 122 to a circuit 124 which provides an actuating signal by way of conductor 126 to solenoid 92. Thus when switch 116 is closed at the surface a sonic signal is sent to actuate solenoid 92, causing the retrieval capsule to be released.

A cord or line 128 connects the retrieval capsule to the fishing buoy. The line 128 is preferably wound on a spool 130 formed on the exterior of the retrieval capsule housing 58. As with spool 48 on the fishing buoy, spool 130 is preferably of a diameter such that each wrap indicates a selected length, such as one foot, so that the user can wrap sufficient turns of line 128 on the spool 130 to ensure that the retrieval capsule will float on the surface. When the operator is preparing the fishing aid for use, he can determine the amount of line 128 required by the use of a sonar fish and bottom indicating devices as previously mentioned. In order to permit the fishing aid to be used at night, the retrieval capsule can be equipped with a light source 132. A battery 134 provides energy not only for the electrical apparatus such as solenoid 92 and sonar circuit 124, but also light 132.

As previously indicated, the fishing aid which has been illustrated and described herein for purposes of explaining the construction of a preferred embodiment of the invention may be used by sport fishermen or commercial fishermen. The fishermen will normally employ a plurality of the devices scattered over an area where fish are found to exist by means of the use of a sonar device. The invention places the baited fish hooks 100 exactly in the area and depth where fish are found to exist. At the present time most fishing is done on a hit-and-miss basis, but the present invention is unique in its ability to place baited fish hooks exactly where they are needed. In addition, the device while being used for fishing does not interfere in any way with the water surface since it is contained at a depth below the water surface until the retrieval capsules are released, which occurs only when a fish is caught at the end of a preselected time or upon a signal transmitted from the surface.

To improve safety of the device in use, means may be provided to retain the hooks 100 in a secure manner. Spaced apart fins 136 formed as a part of body 16 receive the fish hooks 100 therebetween. The fins have an opening which receives pins 138 to retain the hooks. The pins 138 are attached to lines 140 which in turn are attached to a cleat 142 affixed to weight 12. Thus when weight 12 is released it pulls out pins 138, releasing hooks 100 so that they can be freely available to fish.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A submersible fishing aid for use in a body of water, comprising:
   a buoy adaptable to cooperate adjustably with a weight member detachably affixed to the buoy to position the buoy at a selectable height above the bottom of the body of water,
   means actuable by water pressure for detaching the weight member from the buoy,
   means for attaching a hook to the buoy,
   a retrieval capsule connected to the buoy by a cord, and
   means for selectably detaching the retrieval capsule from the buoy to permit the retrieval capsule to float to the water surface.

2. A submersible fishing aid for use in a body of water as described in claim 1 wherein the buoy includes means to retain a hook in attachment to the buoy and means to release the hook from that attachment actuated by movement of the weight.

3. A submersible fishing aid for use in a body of water as described in claim 2 wherein the means to selectably detach the retrieval capsule from the buoy includes time actuated means.

4. A submersible fishing aid for use in a body of water as described in claim 2 wherein the means to selectably detach the retrieval capsule from the buoy includes means actuated by pull on a fish hook.

5. A submersible fishing aid for use in a body of water as described in claim 2 wherein the means to detach the retrieval capsule from the fishing buoy includes means actuated by sonic energy.

6. A submersible fishing aid for use in a body of water as described in claim 2 which includes fish attracting means within the buoy.

7. A submersible fishing aid for use in a body of water as described in claim 2 wherein the retrieval capsule includes a light source.

8. A submersible fishing aid for use in a body of water as described in claim 1 wherein the means to selectably detach the retrieval capsule from the buoy includes time actuated means.

9. A submersible fishing aid for use in a body of water as described in claim 1 wherein the means to selectably detach the retrieval capsule from the buoy includes means actuated by pull on a fish hook.

10. A submersible fishing aid for use in a body of water as described in claim 1 wherein the means to detach the retrieval capsule from the fishing buoy includes means actuated by sonic energy.

11. A submersible fishing aid for use in a body of water as described in claim 1 which includes fish attracting means within the buoy.

12. A submersible fishing aid for use in a body of water as described in claim 1 wherein the retrieval capsule includes a light source.

* * * * *